United States Patent [19]
Lawn et al.

[11] Patent Number: 5,769,476
[45] Date of Patent: Jun. 23, 1998

[54] APPARATUS AND METHOD FOR HANDLING AND PROCESSING ARTICLES

[75] Inventors: Joseph R. Lawn, Brecksville; Roger L. Judson, Richfield, both of Ohio

[73] Assignee: Feco Engineered Systems Ltd., Cleveland, Ohio

[21] Appl. No.: 714,639

[22] Filed: Sep. 16, 1996

[51] Int. Cl.⁶ .................................................. B65G 47/90
[52] U.S. Cl. ................ 294/99.1; 198/803.8; 198/803.12
[58] Field of Search ................................ 294/99.1, 19.2, 294/33, 87.2, 90; 198/803.01, 803.3, 803.8, 803.12, 470.1

[56] References Cited

U.S. PATENT DOCUMENTS

| | | | |
|---|---|---|---|
| 1,658,145 | 2/1928 | Uyei | 294/19.2 |
| 2,619,373 | 11/1952 | Stewart | 294/99.1 |
| 2,829,918 | 4/1958 | Stoakes et al. | 294/99.1 |
| 3,314,714 | 4/1967 | Brubaker | 294/99.1 |
| 3,819,194 | 6/1974 | Grevich et al. | 198/803.8 |
| 4,086,999 | 5/1978 | McDonald | 198/803.12 |
| 4,625,854 | 12/1986 | Deichmann et al. | |
| 4,640,406 | 2/1987 | Willison | |
| 4,676,366 | 6/1987 | Bolte et al. | 294/99.1 |
| 4,684,012 | 8/1987 | Feddersen | 294/99.1 |
| 4,927,205 | 5/1990 | Bowler et al. | |
| 5,558,200 | 9/1996 | Whitby et al. | 198/470.1 |

OTHER PUBLICATIONS

Admitted prior art figures 1–14, No Date.

*Primary Examiner*—Dean Kramer
*Attorney, Agent, or Firm*—Renner, Otto, Boisselle & Sklar, P.L.L.

[57] ABSTRACT

An apparatus and process for coating an article utilizes a chuck to grip the bottleneck. The chuck includes spring fingers which are positioned to engage the bottleneck at equally spaced locations and which are shaped to fit a recess in the bottleneck so as to hold the bottle in place. The chuck includes a nose which fits inside the bottleneck to center the bottle, and the spring fingers are carried by a collar that can slide up and down to bring the spring fingers into or out of engagement with the bottle. Each of the spring fingers is part of a U-shaped spring member, and another part of each spring member holds a sleeve in place which surrounds the spring fingers and the top of the bottle. The sleeve protects the neck of the bottle from unintentional spray coating.

13 Claims, 3 Drawing Sheets

APPARATUS AND METHOD FOR HANDLING AND PROCESSING ARTICLES

FIELD OF THE INVENTION

The present invention relates generally to systems for handling articles including, in particular, containers and for moving them through various operational steps. More particularly, the present invention relates to a chuck for gripping an article so that the article may be manipulated during various operations, including a spray coating operation, and to a method for spray coating an article held in such a chuck.

BACKGROUND OF THE INVENTION

Prior art container transfer systems have employed a conveyor equipped with container holding devices which grip an article, permitting it to be carried through various treatment stations and to be manipulated. Such holding devices have included an elongated spindle and a chuck mounted for telescoping movement on the spindle. Various types of chucks have been devised including chucks with jaws arranged around a spindle and engageable by a cam on the spindle which controls radial expansion and contraction of the jaws for internally gripping a container. Such a device is shown in U.S. Pat. No. 4,927,205. Other chucks have been devised for externally gripping the neck of a container, such chucks being shown in U.S. Pat. Nos. 4,625,854 and 4,640,406.

In addition, U.S. patent application Ser. No. 08/234,299, now U.S. Pat. No. 5,558,200, hereby incorporated herein by reference, discloses a conveyor which utilizes holding devices to carry containers along a conveyor path. The holding devices include a support member having an axis extending generally perpendicular to the conveyor path, and a chuck carried on the support member for telescoping axial movement between first and second axially displaced positions. The chuck is radially expandable and contractible and has an interior socket for receiving therein an end of an article to be gripped by the chuck when the chuck is in the first position. The support member has a plunger portion movable axially into the socket when the chuck moves from a first position on the support member to a second position for engaging and axially ejecting the article from the socket.

In one embodiment, the support member has a main portion to which the plunger portion is removably connected, and the chuck is retained on the support member by the plunger portion that forms an axial obstruction preventing the chuck from separating from the support member. The chuck includes a base supported on the support member at an end thereof and a circumferential arrangement of radially movable gripping fingers extending axially outwardly from the base and defining therebetween the socket for receiving therein an end of an article to be gripped.

These holding devices have proven more suitable for some processes or treatments of the conveyed articles than others. While several of these holders are suitable for use, room for improvement remains.

SUMMARY OF THE INVENTION

The present invention provides a holding device for an article such as a container that has a neck and an opening at one end of the neck. The holding device is useful in a conveyor system for transporting the article through one or more processing stations, for example a coating station.

According to one aspect of the invention the holding device includes a chuck comprising a support having an axially extending nose configured to fit within the opening in the article. A collar is mounted on the support for axial movement, and a hollow sleeve is mounted to the collar and surrounds at least a part of the nose. The chuck further comprises a first resilient leg having a proximal end portion connected to the collar and a distal end portion for engaging the exterior of the article to hold the article in the chuck, and a second resilient leg having a proximal end portion connected to the collar and a distal end portion engaging the interior of the sleeve to hold the sleeve to the collar.

In a preferred embodiment, U-shaped spring members include respective first and second legs, and a connecting portion joining the proximal ends of the first and second legs. The axially extending nose includes a shoulder to engage an end face of the article, and the collar is axially slidable relative to the support between (a) an article retaining position in which the first leg engages the outside of the neck of the article to hold the article on the nose and in the chuck and (b) a second or release position in which the article is released from the chuck.

According to another aspect of the invention, a chuck for use in transporting an article having an opening at one end comprises a chuck body and a socket formed at least in part by a spring member having a pair of axially extending legs joined together by a connecting portion. The chuck body includes a socket, and the connecting portion is secured in the socket against axial withdrawal with at least one of the legs having a resilient portion thereof projecting axially from the chuck body. In a preferred embodiment, both of the legs have respective resilient portions projecting axially from the chuck body, and the resilient portions of the legs are radially spaced apart from one another with respect to a center axis of the chuck body. A hollow sleeve may be removably held to the chuck body by the radially outer one of the resilient portions of the legs. Preferably, a plurality of the spring members are circumferentially spaced apart around a center axis of the chuck body to collectively form interiorly thereof the socket, and the resilient portion of each spring member preferably has at the distal end thereof an outwardly flared camming surface. The article, when inserted into the socket, engages the flared camming surface to cause the respective resilient portion to flex radially outwardly for passage of the article into the socket.

Furthermore, the invention provides a chuck for use in transporting an article having an opening at one end, the chuck comprising a chuck body, gripper elements forming a socket for receiving and gripping an end of the article, an axially extending masking sleeve surrounding the gripper elements, and a plurality of metal spring finger elements anchored in the chuck body. The spring finger elements have resilient outer arm portions collectively holding the sleeve thereto with a slip-fit independently of the gripper elements.

The use of a pair of resilient legs, one to hold the article on the nose and another to hold the sleeve in place, makes the sleeve easy to remove, and the fact that the sleeve is not required to be resilient means that it can be made of a material that is easy to clean.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

A preferred embodiment of the invention has been chosen for purposes of illustration and is shown in the accompanying drawings. In these drawings, from which various parts have been removed or broken away for illustration purposes.

DETAILED DESCRIPTION

Because the invention was conceived and developed for use in transferring containers such as glass or plastic bottles through one or more processing stations, and is particularly useful for such, it will be described herein chiefly in this context. Moreover, the system is particularly suited for spray coating operations such as where a glass or plastic bottle is provided with a coating to obtain desired decorative finish, strength, low permeability or other characteristics. However, the invention in its broader aspects may be applied to transfer other types of articles in other types of applications.

Figure 1:
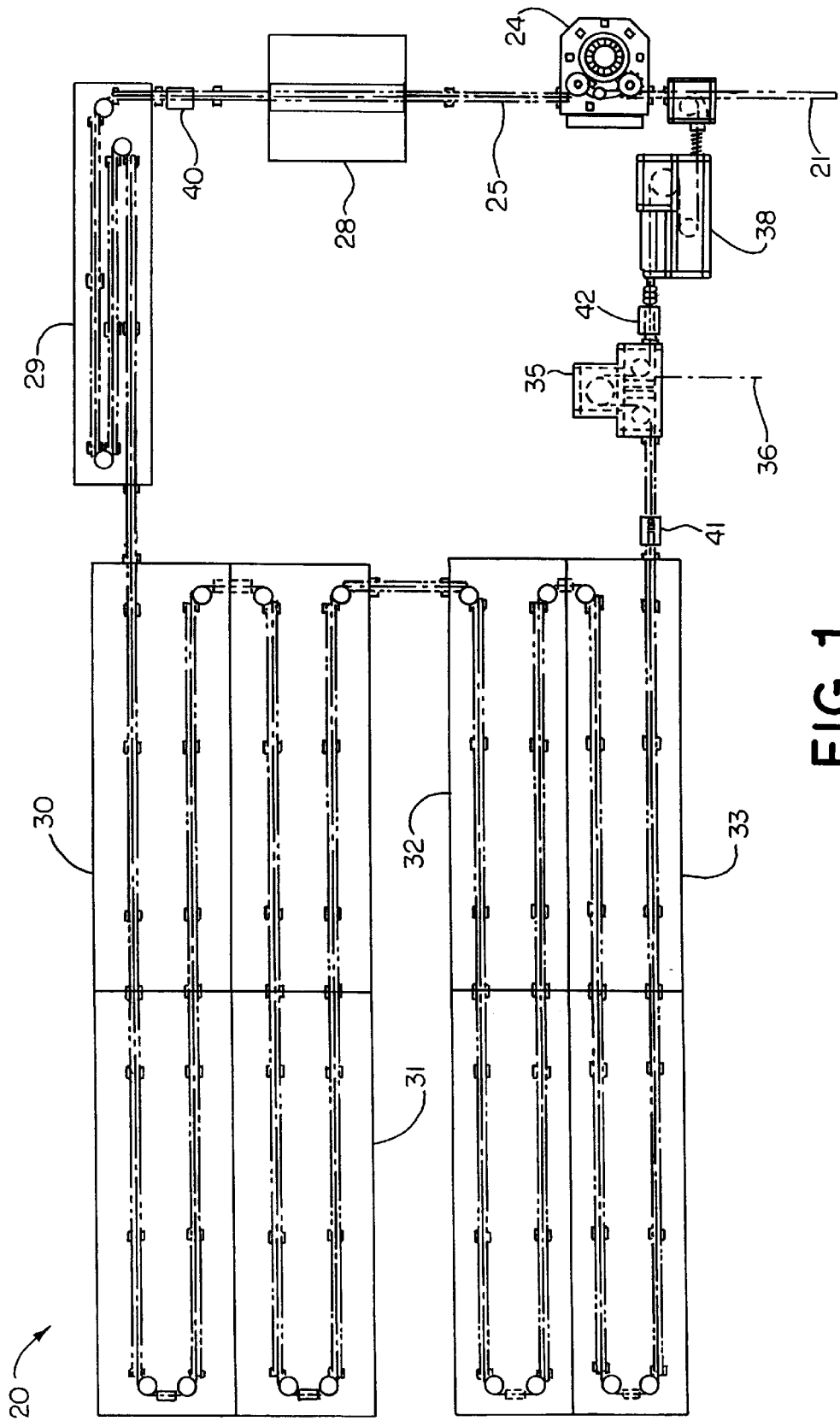
FIG. 1 is a schematic plan view of an article transfer system including a carrier conveyor particularly adapted for transferring bottles from a loader through various processing stations to an unloader.

In FIG. 1, a preferred embodiment of a container transfer system according to the invention is designated generally by reference numeral 20. The system 20 includes an infeed conveyor 21 which may be of mass transport type for single file delivery of containers such as plastic bottles B (FIG. 2) to a loading mechanism (or more simply loader) 24. As the illustrated system is particularly adapted for transferring plastic bottles, reference hereinafter will be made to plastic bottles as the article being transferred. However, it should be understood that the system may be adapted or otherwise modified to transfer other types of containers and, more generally, other types of articles.

Figure 2:
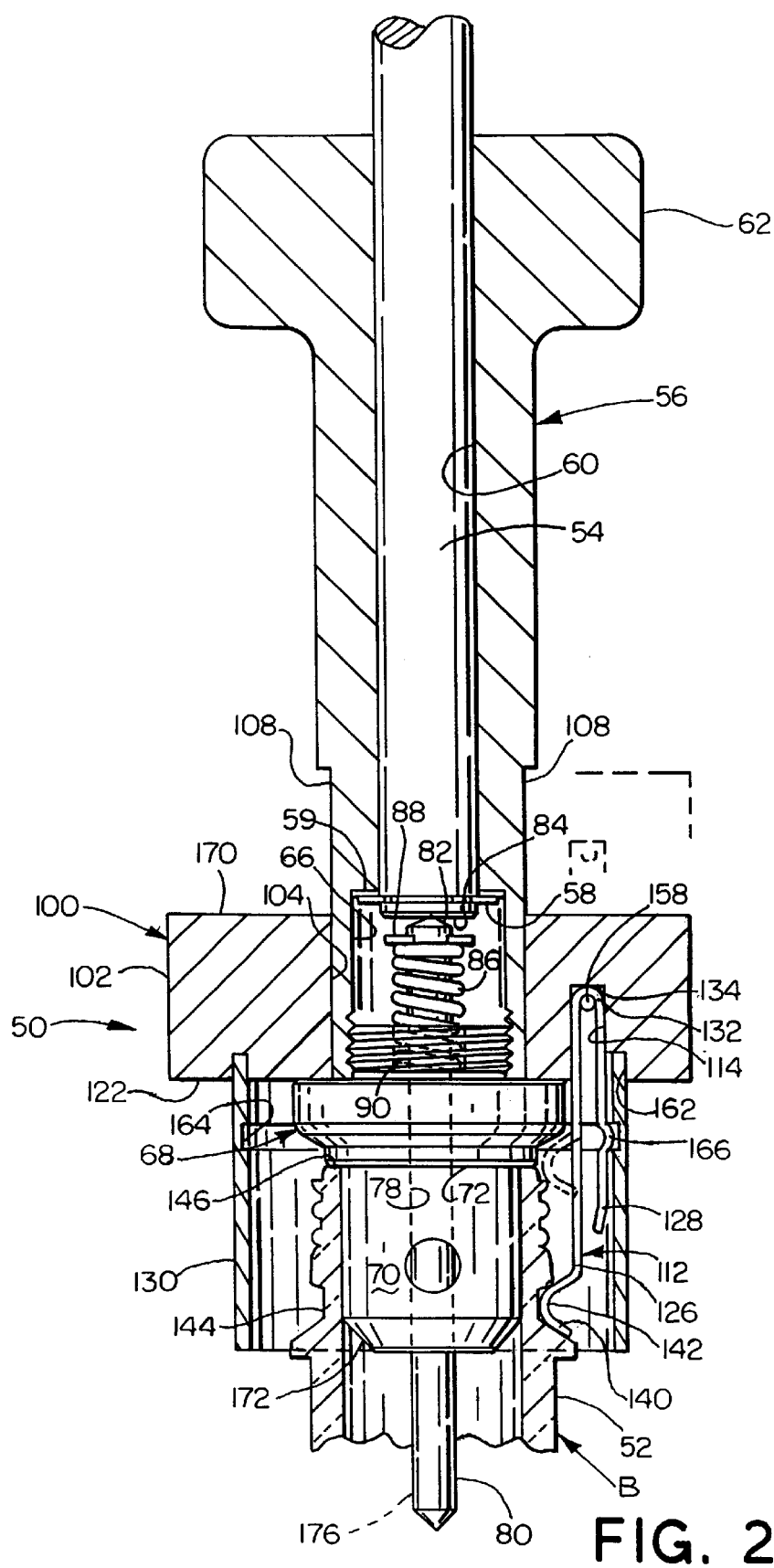
FIG. 2 is a partially cut away elevation view of a chuck constructed in accordance with the present invention and showing a bottle gripped in the chuck.
Figure 3:
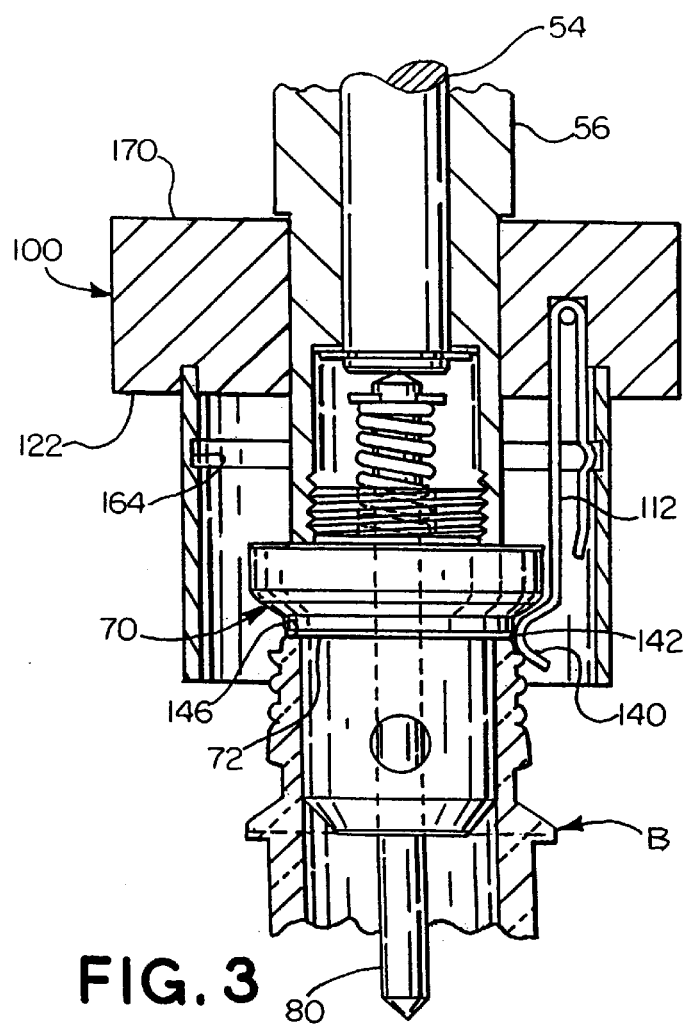
FIG. 3 is an enlarged view of a portion of the chuck of FIG. 2 showing the components in a position to release the bottle from the chuck.

The loader 24 operates to transfer automatically the bottles onto an elevated carrier conveyor 25 equipped with bottle holding devices such as the chuck 50 shown in FIG. 2. The bottles are timed, spaced and loaded onto the overhead carrier conveyor 25 which moves the bottles in timed and spaced relationship to and through one or more processing stations. In the illustrated exemplary system, the bottles are moved by the carrier conveyor 25 through a spray booth 28 for applying a coating to the outer surface of the plastic bottles, then through a flash off processing station 29 and one or more curing ovens 30–33, other processing stations if desired, and finally to an unloading mechanism (or more simply unloader) 35. The unloader 35 operates to automatically transfer the bottles from the overhead carrier conveyor 25 to an outfeed or take-away conveyor 36 which may be of mass transport type.

The system 20 also includes a conveyor drive and take-up mechanism 38 for controllably driving the conveyor. Also, in accordance with the invention, there are strategically located one or more bottle knock-off mechanisms 40–42. In the event that a bottle becomes hung up on a holding device and fails to unload at the unloader 35, the knock-off mechanism 42 will ensure removal of the hung-up bottle prior to passage of the holding device to the loader 24. The knock-off mechanisms 40 and 41 are provided to enable bottles to be removed selectively from the conveyor at strategic locations such as between the coating processing station 28 and the flash-off processing station 29 and between the ovens 30–33 and the unloader 35, as may be desired for sampling purposes or for emptying the conveyor of bottles independently of the unloader.

FIG. 2 illustrates a chuck 50 carried on a pin or central shaft 54 connected to the conveyor 25. The chuck grips the bottle B at its neck 52 to carry the bottle through the various processing stations. The central shaft 54 is connected to the conveyor 25 in a suitable manner. A spindle 56 is rotatably mounted to the shaft 54. A snap ring 58 fits in a recess in the lower end of the shaft 54 and holds the spindle on the shaft. A thrust washer is interposed between the spindle and the snap ring.

Figure 4:
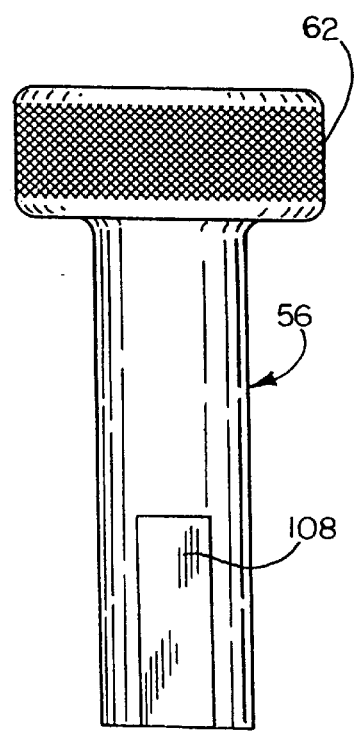
FIG. 4 is an elevation view of a spindle forming a part of the chuck of FIGS. 2 and 3.

The spindle 56 is generally cylindrical and has a smooth central bore through which the shaft 54 extends. The top of the spindle includes a head 62 which is of larger diameter and which has a knurled exterior surface as shown in FIG. 4. The knurled surface allows a drive surface (not shown) to engage the head 62 and cause the spindle to rotate on the shaft 54 so as to rotate the bottle B (or other article) during the aforesaid (or other) processing steps.

The lower end of the spindle 56 (FIG. 2) has an internal bore 66 which is partially threaded. A nose 68 is threaded into the bore 66 and remains in place during normal operation of the chuck 50. The nose 68 includes a cylindrical portion 70 which is proportioned to fit inside the hollow neck 52 of the bottle B with limited radial movement, i.e., with a close slip fit. An annular shoulder 72 located at the top of cylindrical portion 70 abuts the end of the neck of the bottle B limiting its upward movement on the nose 68 and so accurately positions the bottle in the chuck 50.

The nose 68 includes a central cylindrical passage 78 through which a pin 80 extends. The pin 80 has a rounded upper end tip 82 which is held in contact with the flat bottom surface 84 of the central shaft 54 by means of a spring 86. The spring 86 extends between a snap ring 88 connected to the pin 80 and the bottom 90 of a counterbore in the nose 68. This arrangement assures contact between the shaft 54 and the pin 80 even as the chuck 50 rotates on the shaft 54.

Figure 5:
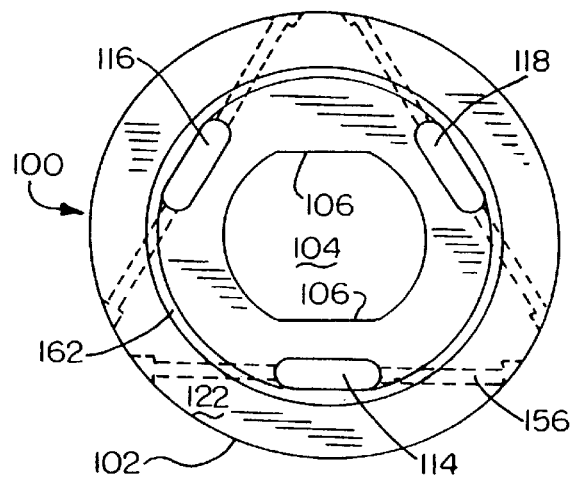
FIG. 5 is a plan view of a collar which fits around the spindle of FIG. 3 and forms a part of the chuck of FIGS. 2 and 3.

The chuck 50 includes a collar 100 shown in FIGS. 2 and 5. The collar 100 is generally cylindrical and has a smooth cylindrical outside surface 102. A central bore 104 extends through the collar 100. The bore 104 has two chordal flats 106 which match flats 108 (FIG. 4) on the lower end portion of the spindle 56. As a result of the cooperating flats 106 and 108, the collar 100 rotates whenever the spindle rotates, but the collar 100 is free to slide axially along the spindle over the length of the flats 108. It should be noted that an additional function of the nose 68 is to retain the collar 100 on the spindle 56.

The collar 100 is adapted to support three identical hairpin spring members 112 (FIG. 2, only one shown). The spring members 112 are snugly received in three evenly spaced sockets 114, 116, and 118 in the collar 100 as shown on FIG. 5. The sockets 114, 116 and 118 extend upward from the bottom annular surface 122 of the collar 100 (FIG. 2) and are positioned radially outward of the nose 68. The spring members 112 can engage the neck of the bottle B to retain it in the chuck 50.

To this end the spring member 112 shown in FIG. 2 is formed from a flat strip of spring steel. The other two spring members (not shown) are similarly constructed and mounted, and the description of the spring member shown in FIG. 2 should be understood to apply to the other two spring members as well. In a preferred embodiment the strip may be about ⅜ inches wide and about 0.030 inches thick. The strip is bent into a hair pin shape with one leg 126 (which may be referred to as the inner leg) adapted to engage the neck of the bottle B. The other, outer leg 128 is adapted to engage the sleeve 130 (whose structure and function are described below). The inner and outer legs 126 and 128 are joined by a U-shaped portion 132 which is seated against the bottom 134 of the socket 114.

The free end of the inner leg 126 is bent to a shape that facilitates retaining the bottle B. The free end of the inner leg 126 has an inclined or tapered lead end 140 and a detent portion 142 that fits in an annular recess 144 in the bottle B. The detent portion 142 is positioned so that the uppermost end face 146 of the bottle B abuts the shoulder 72 of the nose 70 when the detent portion 142 is settled in the recess 144 of the bottle. The exact location and shape of the detent portion 142 depends on the contour of the bottle or other article being handled by the chuck 50.

In order to assure that the spring member 112 accurately holds the bottle in position, it is necessary that the spring member be accurately located in the collar 100. This is accomplished by seating the spring member against the bottom 134 of the socket 114. The collar includes cross drilled passage 156 (FIG. 5) which extends chordally, intersecting the outside surface 102 of the collar 100 in two places and passes through the socket 114 just below the bottom 134. Once the spring member 112 is seated in the socket 114, a roll pin 158 (FIG. 2) is forced into the passage 156 so that it spans the socket and traps the U-shaped portion 132 of the spring member 112 against the bottom 134 of the socket. The other two sockets 116 and 118 are identically shaped and constructed to hold identical spring members 112 in an identical manner.

The chuck 50 includes a sleeve 130 whose purpose is to shield at least part of the upper end portion or neck 52 of the bottle B from certain spraying and coating operations. The sleeve 130 is generally in the form of a hollow cylinder. The sleeve member is received in shallow annular recess 162 (FIGS. 2 and 5) formed in the bottom surface 122 of the collar 100. The sleeve receiving recess 162 is positioned so that it just circumscribes the sockets 114–118. In this way the outer legs of the spring members 112 are flush with the inside of the sleeve 130.

As noted above, the outer leg 128 of the spring member 112 holds the sleeve 130 in place. This is accomplished by frictional engagement and/or by means of a groove 164 around the inside of the sleeve and a corresponding detent curve 166 in the outer leg of the spring member 112. The detent curve 166 is positioned so that when the sleeve 130 is seated in the annular recess 162, the detent curve rests in the groove 164, pressed there by the resilient nature of the spring member 112. With this arrangement, the sleeve can be easily removed by pulling it downward away from the collar 100. This may be necessary to remove excess coating material that may build up on the outside of the sleeve when the chuck 50 is used in certain coating or treating operations.

As noted above, the collar 100 is free to move up or down on the spindle 56 to the extent of the flats 108 on the spindle. This movement is controlled by cam surfaces (not shown) which bear against the bottom surface 122 of the collar and the opposite, annular top surface 170. These cam surfaces may be positioned at various locations along the path of the conveyor 25 (FIG. 1) to keep the collar and the spring members 112 in the desired position. For example, to load a bottle into the chuck 50, the bottle is raised up from below (as viewed in FIG. 2) while a cam keeps the collar 100 at the bottom of its stroke in the position shown in FIG. 2.

As the bottle is lifted up (by equipment not shown), the end 146 of the neck 52 of the bottle B contacts the outwardly tapered end 140 of the spring member 112 or the inwardly tapered end portion 172 of the nose 70. These two tapers serve to guide the bottle into position on the nose 70. As the bottle is pushed upward, the detent portion 142 of the spring member 112 moves radially in and out following the contours of the bottle until the end face 146 of the bottle touches the shoulder 72 of the nose 70. At this point the detent portion 142 fits into the recess 144 in the bottle B and holds the bottle in place. It should be clear that a different nose 68 and a different spring member 112 could be used for a differently configured bottle B or for some other article carried by the chuck 50.

It is important to note that the operation of the inner arm of the spring member 112 is independent of the movement of the outer arm 128. This allows the operation of the inner arm to be independent of any build up of coating material on the sleeve 130. Of course this same result could be achieved by having separate spring members for the bottle retention function and the sleeve retention function, but fewer parts and simpler installation result from using a single hairpin spring member.

Once the bottle is in the chuck 50, it may be advanced by the conveyor 25 through various processing stations. In particular, the chuck 50 may be used in connection with a process for spraying a coating on bottles.

The spindle 56, the collar 100, the nose 70 and the sleeve 130 may be made of a suitable material such as PTFE, while the central shaft 54 and pin 80 may be made of stainless steel, for example.

To carry out a spray coating operation, the bottle B is gripped by the chuck 50 as described above. The bottle is then carried through a spray zone where a coating is sprayed onto the bottle. The sleeve 130 reduces the amount of sprayed material that might otherwise reach the chuck gripping components and the threaded portion of the bottle B which typically does not need to be coated, since this portion of the bottle is thus blocked by the sleeve from the direct path of the sprayed particles.

Once the bottle B has been carried by the conveyor 25 through the various processing steps, it is discharged at the unloader 35. At this station, a cam surface bears against the bottom surface 122 of the collar 100, moving it upward to the position shown in FIG. 2. At this point, the shoulder 72 of the nose pushes the bottle downwardly, causing the inner leg 126 of the spring member 112 to spring outward to release the bottle. The inner leg 126 of the spring member 112 bears against the top portion of the bottle B and the tapered surface 140 can actually eject the bottle from the nose 70. This positive action assists in removing the bottle from the chuck 50.

Although the invention has been shown and described with respect to an exemplary embodiment thereof, it is obvious that equivalent alterations and modifications will occur to others skilled in the art upon the reading and understanding of the specification. The present invention includes all such equivalent alteration and modification.

What is claimed is:

1. A chuck for use in a machine for handling and treating an article having an opening at one end, said chuck comprising a support having an axially extending nose configured to fit within the opening in the article, a collar mounted on the support for axial movement, a hollow sleeve mounted to the collar and surrounding at least a part of the nose, a first resilient leg having a proximal end portion connected to the collar and a distal end portion for engaging the exterior of the article to hold the article in the chuck, and a second resilient leg having a proximal end portion connected to the collar and a distal end portion engaging the interior of the sleeve to hold the sleeve to the collar.

2. The chuck of claim 1, including a plurality of said first legs and a plurality of said second legs.

3. The chuck of claim 1, wherein the first and second legs are integrally formed as a single unit.

4. The chuck of claim 3, including a U-shaped spring member including the first and second legs and a connecting portion joining the proximal ends of said first and second legs, and the collar having a socket receiving the connecting portion.

5. The chuck of claim 4, wherein the nose includes a shoulder to engage an end face of the article and wherein the collar is axially slidable on the support between an article retaining position in which the first leg engages the outside of the neck of the article to hold the article on the nose and in the chuck and a second position in which the article is released from the chuck.

6. The chuck of claim 4, including a plurality of said sockets in the collar, and a plurality of said spring members secured at the connecting portions thereof in the sockets.

7. The chuck of claim 4, including a pin engaging the connecting portion of the spring member to retain the spring member in the socket.

8. A chuck for use in a machine for handling and treating an article having an opening at one end, said chuck comprising a chuck body and a first socket formed at least in part by a plurality of spring members each having a pair of axially extending legs joined together by a connecting portion, said chuck body including a second socket for each spring member, and said connecting portion of each spring member being secured in the respective said second socket against axial withdrawal with at least one of said legs having a resilient portion thereof projecting axially from said chuck body.

9. The chuck of claim 8, wherein both of said legs have respective resilient portions projecting axially from said chuck body.

10. The chuck of claim 9, wherein the resilient portions of said legs are radially spaced apart from one another with respect to a center axis of said chuck body, and further comprising a hollow sleeve removably held to the chuck body by the radially outer one of the resilient portions of the legs.

11. The chuck of claim 8, including a plurality of said spring members circumferentially spaced apart around a center axis of said chuck body to collectively form interiorly thereof the first socket, and the resilient portion of each spring member has at the distal end thereof an outwardly flared camming surface, the article when inserted into the first socket engaging the flared camming surface to cause the respective resilient portion to flex radially outwardly for passage of the article into the first socket.

12. The chuck of claim 8, including a plurality of said spring members circumferentially spaced apart around a center axis of said chuck body to collectively form interiorly thereof the first socket, and the resilient portion of each spring member has at the distal end thereof a radially inwardly extending detent portion for engaging an exterior shoulder surface on the article.

13. A chuck for use in a machine for handling and treating an article having an opening at one end, said chuck comprising a chuck body, gripper elements forming a socket for receiving and gripping an end of the article, an axially extending masking sleeve surrounding the gripper elements, and a plurality of metal spring finger elements anchored in said chuck body, the spring finger elements having resilient outer arm portions collectively holding the sleeve thereto with a slip-fit independently of the gripper elements.

* * * * *